US012630291B2

(12) United States Patent
Koustubhan et al.

(10) Patent No.: US 12,630,291 B2
(45) Date of Patent: May 19, 2026

(54) AIRCRAFT SEAT BASE TRACKING SYSTEM

(71) Applicant: B/E Aerospace, Inc., Winston-Salem, NC (US)

(72) Inventors: Arjun Koustubhan, Hyderabad (IN); Michael L. Oleson, Parkland, FL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 27 days.

(21) Appl. No.: 18/788,856

(22) Filed: Jul. 30, 2024

(65) Prior Publication Data

US 2025/0256850 A1 Aug. 14, 2025

(30) Foreign Application Priority Data

Feb. 8, 2024 (IN) .............................. 202411008602

(51) Int. Cl.
B64D 11/06 (2006.01)

(52) U.S. Cl.
CPC ........ B64D 11/0696 (2013.01); B64D 11/064 (2014.12)

(58) Field of Classification Search
CPC .......................... B64D 11/0696; B64D 11/064
See application file for complete search history.

(56) References Cited

U.S. PATENT DOCUMENTS 2,864,431 A * 12/1958 Eaton ..................... B60N 2/245
248/419
9,139,303 B2 9/2015 Bechtold et al.

| 9,714,095 | B2 | 7/2017 | Erhel et al. |
| 10,583,926 | B2 * | 3/2020 | Erhel ....................... B60N 2/14 |
| 10,654,572 | B2 | 5/2020 | Bendele et al. |
| 11,021,255 | B2 | 6/2021 | Oleson et al. |
| 11,548,645 | B2 | 1/2023 | Oleson |
| 11,613,361 | B2 | 3/2023 | Koustubhan et al. |
| 11,685,532 | B2 | 6/2023 | Erhel et al. |
| 2006/0108848 | A1 * | 5/2006 | Williamson ............. A47C 3/18 |
| | | | 297/344.24 |
| 2016/0288910 | A1 | 10/2016 | Udriste et al. |
| 2016/0325837 | A1 | 11/2016 | Erhel et al. |

(Continued)

OTHER PUBLICATIONS

European Patent Office, Extended European Search Report received in EP Application No. 25155593.4, Apr. 14, 2025, 9 pages.

(Continued)

*Primary Examiner* — Amy J. Sterling
(74) *Attorney, Agent, or Firm* — Suiter Swantz IP

(57) ABSTRACT

A base tracking system may include a platform couplable to a floor of an aircraft via a set of seat tracks, where the platform is fixed to one or more floor fittings coupled to the set of seat tracks when coupled to the floor of the aircraft. The base tracking system may include one or more frame members arranged proximate to the platform. The base tracking system may include one or more base tracking tubes coupled to the platform via one or more tube attachment members, where the one or more base tracking tubes are fixed to the platform. The base tracking system may include a translation assembly configured to translate the one or more frame members along a shaft of the one or more base tracking tubes to infinitely stop the base tracking system.

16 Claims, 15 Drawing Sheets

(56) References Cited

U.S. PATENT DOCUMENTS

2018/0194474 A1    7/2018  Jones et al.
2020/0307806 A1    10/2020  Wilcynski et al.

OTHER PUBLICATIONS

"Class-defining comfort for a new class of business jets", URL: https://businessaircraft.bombardier.com/en/nuage-seat.
The Nuage Seat—First fully floating base; URL: : https://youtu.be/ll3gjiwcXJ8.

* cited by examiner

AIRCRAFT SEAT BASE TRACKING SYSTEM

CROSS-REFERENCE TO RELATED APPLICATIONS

The present application claims the benefit of India Provisional Application No. 202411008602, filed Feb. 8, 2024, which is incorporated herein by reference in the entirety.

TECHNICAL FIELD

The subject matter disclosed herein is related to the field of aircraft seats and, in particular, to an aircraft seat base with tracking.

BACKGROUND

Often it is desirable to have an aircraft seat configured with one or more comfort features for a passenger to adjust as necessary. One feature that is lacking in conventional aircraft seats is the ability to provide aircraft seat base tracking with infinite adjustment positions. Further, there is a need for seat tracks to be hidden for improved aesthetics while still providing the seat base tracking.

SUMMARY

A seat base tracking system for an aircraft seat is disclosed, in accordance with one or more embodiments of the present disclosure. In embodiments, the seat base tracking system includes a platform couplable to a floor of an aircraft via a set of seat tracks, where the platform is fixed to one or more floor fittings coupled to the set of seat tracks when coupled to the floor of the aircraft. In embodiments, the seat base tracking system includes one or more frame members arranged proximate to the platform. In embodiments, the seat base tracking system includes one or more base tracking tubes coupled to the platform via one or more tube attachment members, where the one or more base tracking tubes are fixed to the platform. In embodiments, the seat base tracking system includes a translation assembly configured to translate the one or more frame members along a shaft of the one or more base tracking tubes to provide seat base tracking with infinite adjustment positions, where the seat base tracking is independent from the set of seat tracks.

In some embodiments, the translation assembly may further include one or more pillow blocks, where the one or more pillow blocks may be coupled to the one or more frame members, where the shaft of the one or more base tracking tubes may be configured to translate though an opening in the one or more pillow blocks when translating along the one or more base tracking tubes.

In some embodiments, the translation assembly may further include one or more brake assemblies, where disengagement of the one or more brake assemblies may translate the one or more frame members along the shaft of the one or more base tracking tubes.

In some embodiments, the system may further include one or more rollers, where the one or more rollers may be coupled to the platform, where the one or more rollers may be configured to rotate about a cavity defined within the one or more frame members when the translation assembly translates the one or more frame members.

In some embodiments, the system may further include one or more dampers positioned proximate to the one or more rollers.

In some embodiments, the platform may be a one-piece plinth.

In some embodiments, the system may further include one or more cross-tubes coupled to the one or more frame members.

In some embodiments, the system may further include a telescoping shroud assembly, where the telescoping shroud assembly may include a fixed shroud coupled to a fixed portion of the seat base tracking system and a translating shroud coupled to the fixed shroud, where the translating shroud may be configured to translate via a shroud translation sub-assembly when the one or more frame members translate.

In some embodiments, the shroud translation sub-assembly may include a slide and carriage system.

An aircraft seat is disclosed, in accordance with one or more embodiments of the present disclosure. In embodiments, the aircraft seat includes a seat frame. In embodiments, the aircraft seat includes a two-stage tracking system including a first stage tracking system and a second stage tracking system, where the first stage tracking system is couplable to the seat frame, where the second stage tracking system is couplable to a floor of an aircraft. In embodiments, the second stage tracking system includes a platform couplable to a floor of an aircraft via a set of seat tracks, where the platform is fixed to one or more floor fittings coupled to the set of seat tracks when coupled to the floor of the aircraft. In embodiments, the second stage tracking system includes one or more frame members arranged proximate to the platform. In embodiments, the second stage tracking system includes one or more base tracking tubes coupled to the platform via one or more tube attachment members, where the one or more base tracking tubes are fixed to the platform. In embodiments, the second stage tracking system includes a translation assembly configured to translate the one or more frame members along a shaft of the one or more base tracking tubes to provide seat base tracking with infinite adjustment positions, where the seat base tracking is independent from the set of seat tracks. In embodiments, the second stage tracking system includes a telescoping shroud assembly. In embodiments, the telescoping shroud assembly includes a fixed shroud coupled to a fixed portion of the two-stage tracking system. In embodiments, the telescoping shroud assembly includes a translating shroud coupled to the fixed shroud, where the translating shroud is configured to translate via a shroud translation sub-assembly when the one or more frame members of the second stage tracking system translate.

In some embodiments, the translation assembly may further include one or more pillow blocks, where the one or more pillow blocks may be coupled to the one or more frame members, where the shaft of the one or more base tracking tubes may be configured to translate though an opening in the one or more pillow blocks when translating along the one or more base tracking tubes.

In some embodiments, the translation assembly may further include one or more brake assemblies, where disengagement of the one or more brake assemblies may translate the one or more frame members along the shaft of the one or more base tracking tubes.

In some embodiments, the second stage tracking system may further include one or more rollers, where the one or more rollers may be coupled to the platform, where the one or more rollers may be configured to rotate about a cavity defined within the one or more frame members when the translation assembly translates the one or more frame members.

In some embodiments, the system may further include one or more dampers positioned proximate to the one or more rollers.

In some embodiments, the platform may be a one-piece plinth.

In some embodiments, the system may further include one or more cross-tubes coupled to the one or more frame members and the first stage tracking system.

In some embodiments, the first stage tracking system may be configured to translate along a shaft of the one or more cross-tubes during installation to a position, where the first stage tracking system may be fixed in the position during operation.

In some embodiments, the shroud translation sub-assembly may include a slide and carriage system.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
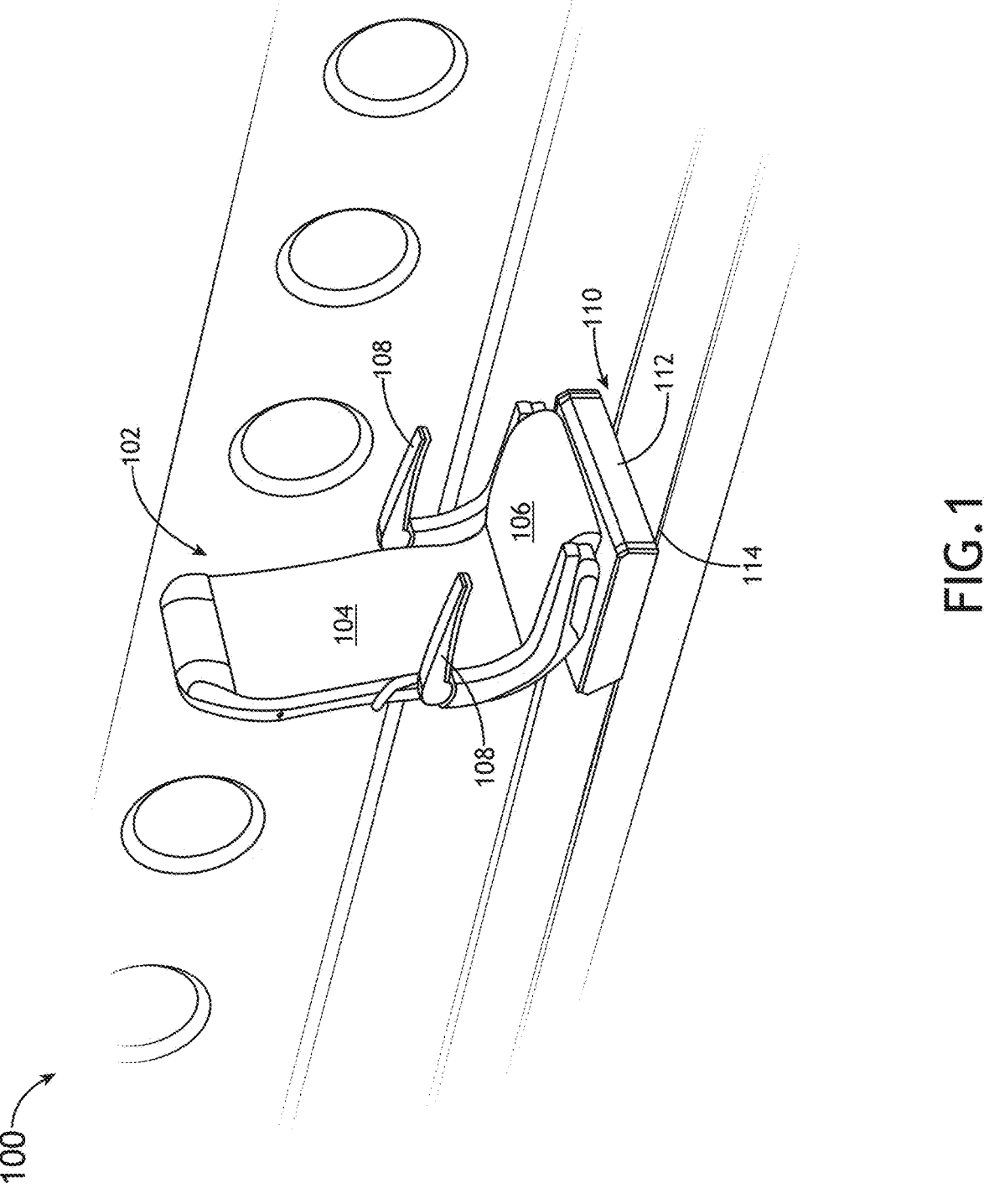
FIG. 1 illustrates an aircraft cabin with an aircraft seat including a plinth seat base, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-5B in general illustrate an aircraft seat base tracking system for an aircraft seat, in accordance with one or more embodiments of the disclosure.

Often it is desirable to have an aircraft seat configured with one or more comfort features for a passenger to adjust as necessary. One feature that is lacking in conventional aircraft seats is the ability to provide aircraft seat base tracking with infinite adjustment positions. Currently, conventional aircraft seat bases provide only incremental tracking that is dependent on lobes within the seat track. This direct dependence on the seat track for base tracking limits the amount of base tracking that can occur. For example, the seat track length is directly proportional to the amount of base tracking that can occur. Additionally, conventional aircraft seats with base tracking expose the seat track. However, there is a need for seat tracks to be hidden for improved aesthetics while still providing the seat base tracking.

Accordingly, embodiments of the present disclosure are directed to curing one or more of the shortfalls of previous approaches identified above. Broadly, embodiments of the present disclosure are directed to aircraft seat base tracking system for an aircraft seat to adjust a position of the aircraft seat. More particularly, embodiments of the present disclosure are directed to an aircraft seat base tracking system for an aircraft seat that provides base tracking with infinite adjustment positions rather than incremental tracking that is dependent on the seat track. For example, the aircraft seat base tracking system may include a platform that is fixed to the seat tracks, where the aircraft seat is tracked by tracking one or more frame members along a shaft of one or more base tracking tubes via a translation assembly. In this regard, the platform remains in a fixed position, while the one or more framing members are able to track along the shaft of the one or more base tracking tubes and infinitely stop when a desired position is reached within a tracking range.

Embodiments of the present disclosure are further directed to a telescopic shroud system. For example, the telescopic shroud system may track along with the aircraft seat base tracking system to hide unwanted areas of the aircraft floor (e.g., seat tracks, or the like).

It is noted herein that the aircraft seat base tracking system may be implemented in any environment or number of environments. For example, the environment may include any type of vehicle known in the art. For instance, the vehicle may be any air, land, or water-based personal equipment or vehicle; any air, land, or water-based commercial equipment or vehicle; any air, land, or water-based military equipment or vehicle known in the art. By way of another example, the environment may include a commercial or industrial establishment (e.g., a home or a business).

Where the environment may be an aviation environment, the aircraft cabin designs need to be certified in accordance with aviation guidelines and standards, while being designed so as not to lose the intended functionality of the structures and/or monuments in the aircraft cabin. For example, the structures and/or monuments in the aircraft cabin may need to be configured in accordance with aviation guidelines and/or standards put forth by, but not limited to, the Federal Aviation Administration (FAA), the European Aviation Safety Agency (EASA) or any other flight certification agency or organization; any other guidelines agency or organization; or the like.

FIG. 1 illustrates an aircraft cabin 100 including an aircraft seat 102, in accordance with one or more embodiments of the disclosure.

The aircraft seat 102 may include a seatback 104. The aircraft seat 102 may include a seat pan 106. The aircraft seat 102 may include one or more arms 108. The aircraft seat 102 may be coupled to a base 110. The base 110 may be covered by a shroud 112. For example, the shroud 112 may include one or more sections configured to cover at least a portion of the aircraft seat 102. The shroud 112 may be configured to translate with respect to a translation of the base 110, as will be discussed further herein.

Figure 2A:
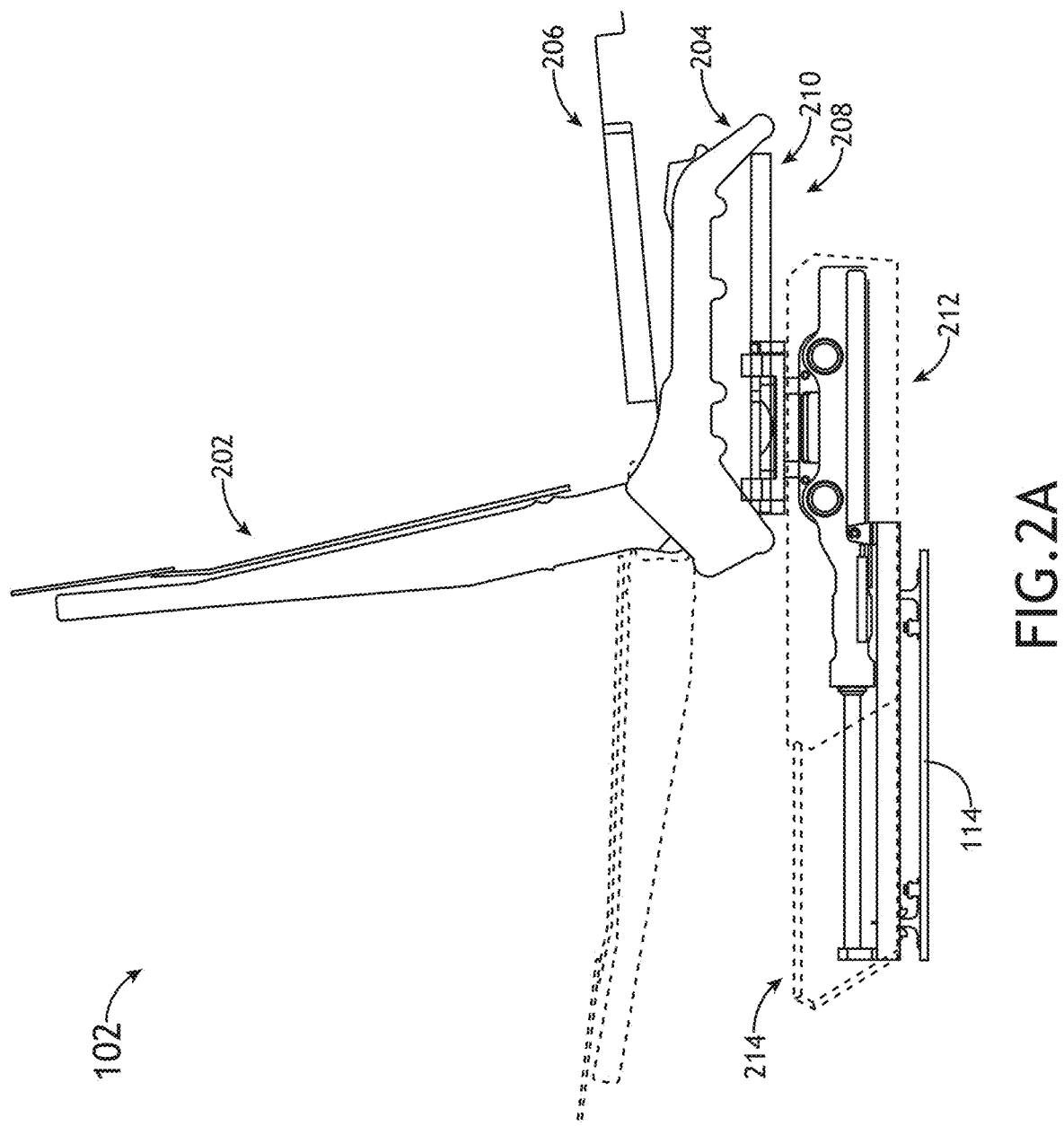
FIG. 2A illustrates a seat frame and a base assembly of the aircraft seat including a two-stage tracking system and a telescoping shroud assembly, in accordance with one or more embodiments of the disclosure.

Referring to FIG. 2A, the aircraft seat 102 may include a seatback frame 202. The aircraft seat 102 may include a seat frame 204. The aircraft seat 102 may include a seat pan frame 206. One or more of the seatback frame 202 and/or the seat pan frame 206 may be directly coupled, or indirectly coupled via one or more interconnecting components, to one or more of the components of the seat frame 204.

For purpose of the present disclosure, the "upper seat" may include, but is not limited to, the seatback frame 202, the seat frame 204, the seat pan frame 206, or the like, unless otherwise noted herein.

The base 110 may include two-stage tracking system 208. For example, the two-stage tracking system 208 may include a first stage tracking system 210 (or an upper tracking system) and a second stage tracking system 212 (or a lower tracking system). It is noted that the two-stage tracking system 208 may be adapted and mounted in any orientation to cater to various aircraft seat base designs and requirements. For example, the first stage tracking system 210 (or upper tracking system) may be coupled to an upper portion of the aircraft seat 102 and the second stage tracking system 212 (or lower tracking system) may be coupled to the floor of the aircraft cabin 100, as discussed further herein.

The first stage tracking system 210 may include a vertical adjustment system. The vertical adjustment system may include a track and swivel mechanism, as generally discussed in U.S. Pat. No. 11,613,361, issued on Mar. 28, 2023, which is herein incorporated by reference in the entirety.

The second stage tracking system 212 may include a plinth seat base tracking system 212, as will be discussed further herein.

Figure 2B:
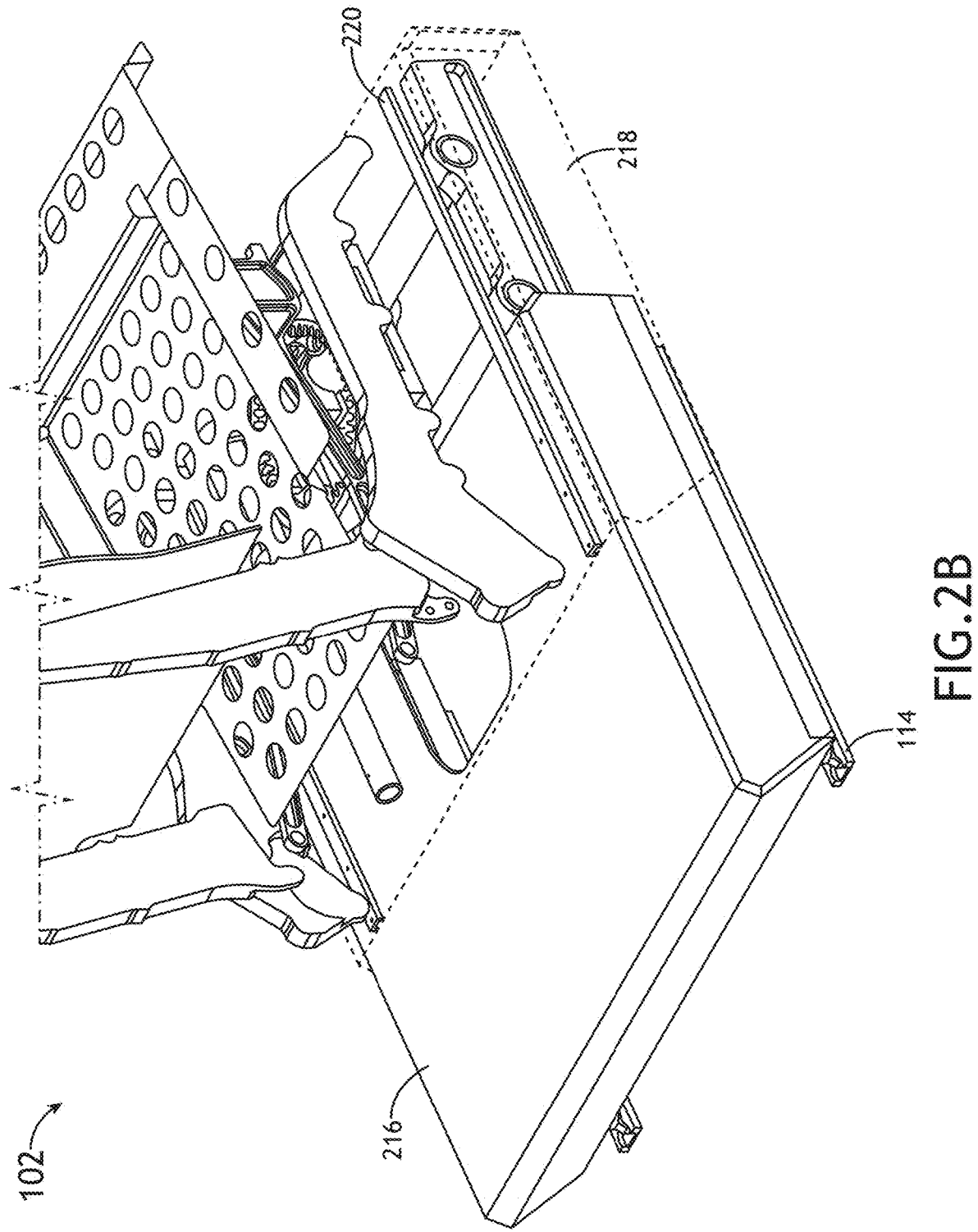
FIG. 2B illustrates a seat frame and a base assembly of the aircraft seat including a two-stage tracking system and a telescoping shroud assembly, in accordance with one or more embodiments of the disclosure.

Referring to FIGS. 2A-2D, the plinth seat base tracking system 212 may be at least partially covered using a telescopic shroud assembly 214. The telescopic shroud assembly 214 may include an inner shroud portion 216 and an outer shroud portion 218. For example, the inner shroud portion 216 may include a fixed shroud portion 216 and the outer shroud portion 218 may include a translating (or tracking) shroud portion 218. For instance, as shown in FIG. 2B, the fixed shroud portion 216 may be coupled to a fixed portion of the seat base tracking system (i.e., seat base), such that the fixed shroud portion 216 is fixed (i.e., does not move) to the set of seat tracks 114 and does not expose the set of seat tracks 114. Further, as shown in FIG. 2B, the translating (or tracking) shroud portion 218 may be coupled to the fixed shroud portion 216 and configured to translate via a shroud translation sub-assembly. For example, the translating (or tracking) shroud portion 218 may track with the plinth seat base tracking system 212. In this regard, the seat back tracking may be independent from the set of seat tracks 114.

Figure 2C:
FIG. 2C illustrates a seat frame and a base assembly of the aircraft seat including a two-stage tracking system and a telescoping shroud assembly, in accordance with one or more embodiments of the disclosure.
Figure 2D:
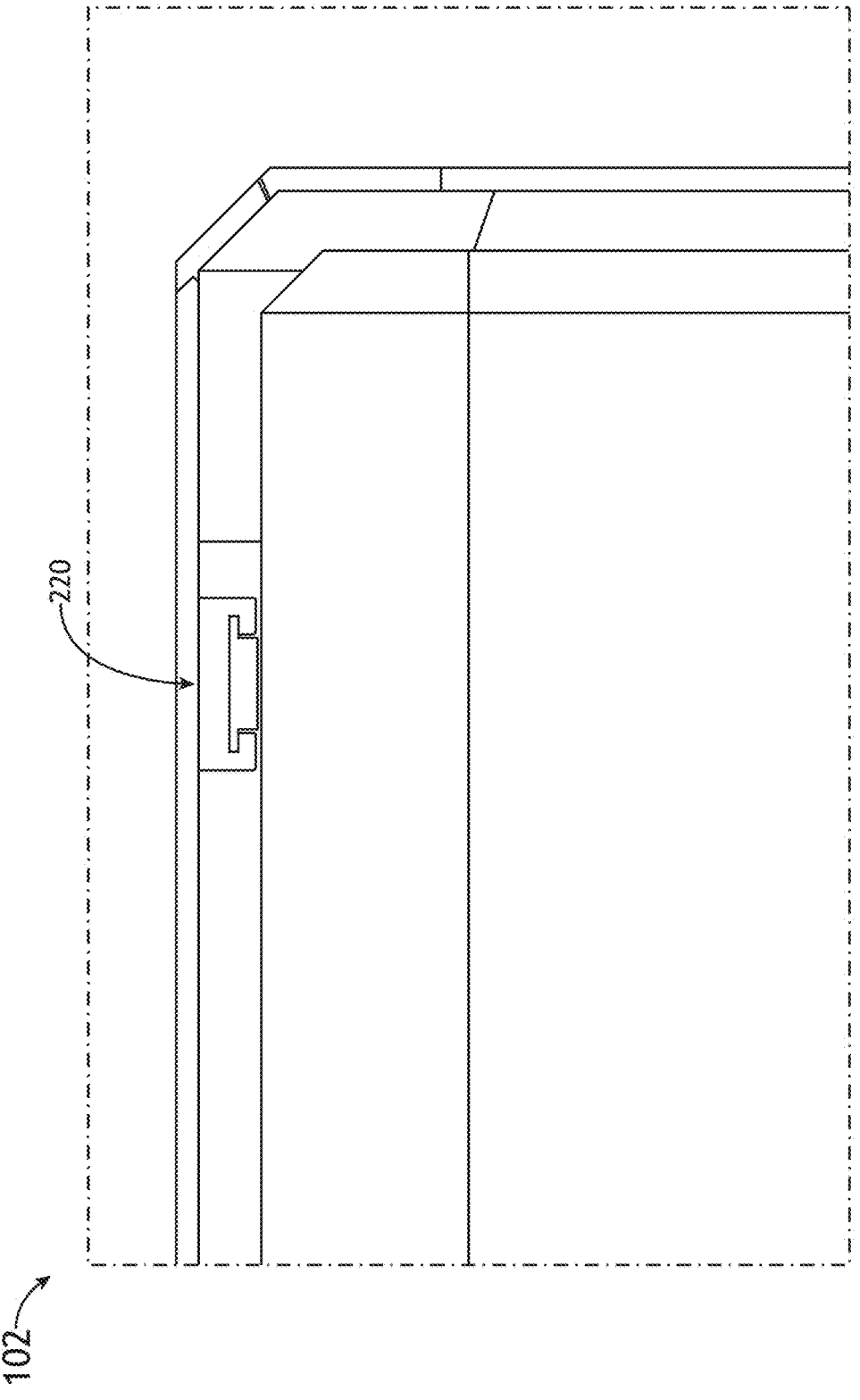
FIG. 2D illustrates a telescopic shroud assembly, in accordance with one or more embodiments of the disclosure.

Referring to FIGS. 2B-2D, the translation sub-assembly of the translating (or tracking) shroud portion 218 may include a slide and carriage system 220. For example, a carriage of the slide and carriage system 220 may be coupled to the fixed shroud portion 216 and a slide of the slide and carriage system 220 may be coupled to translating (or tracking) shroud portion 218, or vice versa. In this regard, as shown in FIG. 2B, the slide on the translating (or tracking) shroud portion 218 may translate along the fixed carriage of the fixed shroud portion 216 along with the plinth seat base tracking system 212. Although FIGS. 2B-2D depict the translation sub-assembly including the slide and carriage system 220, it is contemplated herein that the translation sub-assembly may include any suitable sub-assembly for translating the translating (or tracking) shroud portion 218. As such, FIGS. 2B-2D are provided merely for illustrative purposes and shall not be construed as limiting the scope of the present disclosure.

Referring to FIGS. 3A-5, the plinth seat base tracking system 212 may include a platform 300 (or plinth 300). The platform 300 may be fixed to the seat tracks 114. For example, the platform 300 may be coupled to floor fittings 301 of the seat tracks 114. In this regard, the platform 300 may be fixed to the seat tracks 114 via the fixed floor fittings 301. It is contemplated that the fixed platform 300 may provide a number of advantages. For example, the plinth seat base tracking system 212 may be used with any number of seat tracks 114, without the need for a customized seat track. By way of another example, the fixed platform 300 of the plinth seat base tracking system 212 may be fixed at a wide (or large stance). In this regard, instabilities are reduced, routing is improved, and stability is improved.

The platform 300 (or plinth 300) may be formed of one-piece or two or more individual components. For example, as shown in FIGS. 3A-3F, the platform 300 may include a one-piece plinth 300. Further, it is contemplated that the platform 300 (or plinth 300) may be formed of any suitable material such as, but not limited to, one or more metals, one or more thermoplastics, one or more composites, or the like.

The plinth seat base tracking system 212 may include one or more frame members 302. For example, the one or more frame members 302 may be arranged proximate to the platform 300. The one or more frame members 302 may be configured to translate via a translation assembly to infinitely adjust the plinth seat base tracking system 212, as will be discussed further herein.

The one or more frame members 302 may be configured to receive one or more portions of one or more cross-tubes 304. For example, the one or more frame members 302 may be configured to receive at least a front cross-tube 304 and a rear cross-tube 304. The respective cross-tubes 304 may be configured to couple to the first stage tracking system 210, as discussed previously herein.

The first stage tracking system 212 may be able to translate along the shaft of the respective cross-tubes 304 during installation and then fixed at a specified position. In this regard, the first stage tracking system 212 may be fixed at the specified position during operation.

Figure 3A:
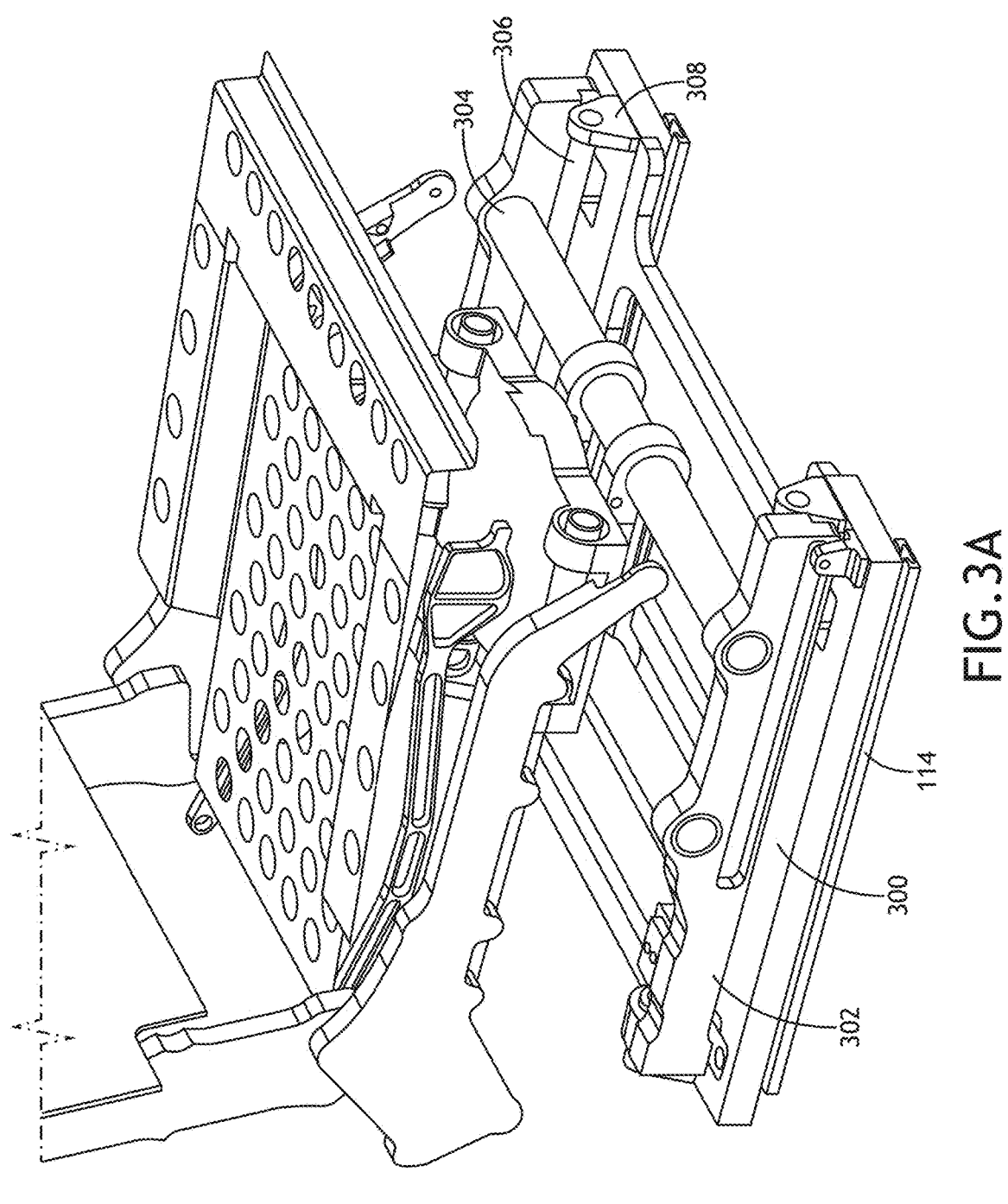
FIG. 3A illustrates a plinth seat base tracking system of the two-stage tracking system, in accordance with one or more embodiments of the disclosure.
Figure 3B:
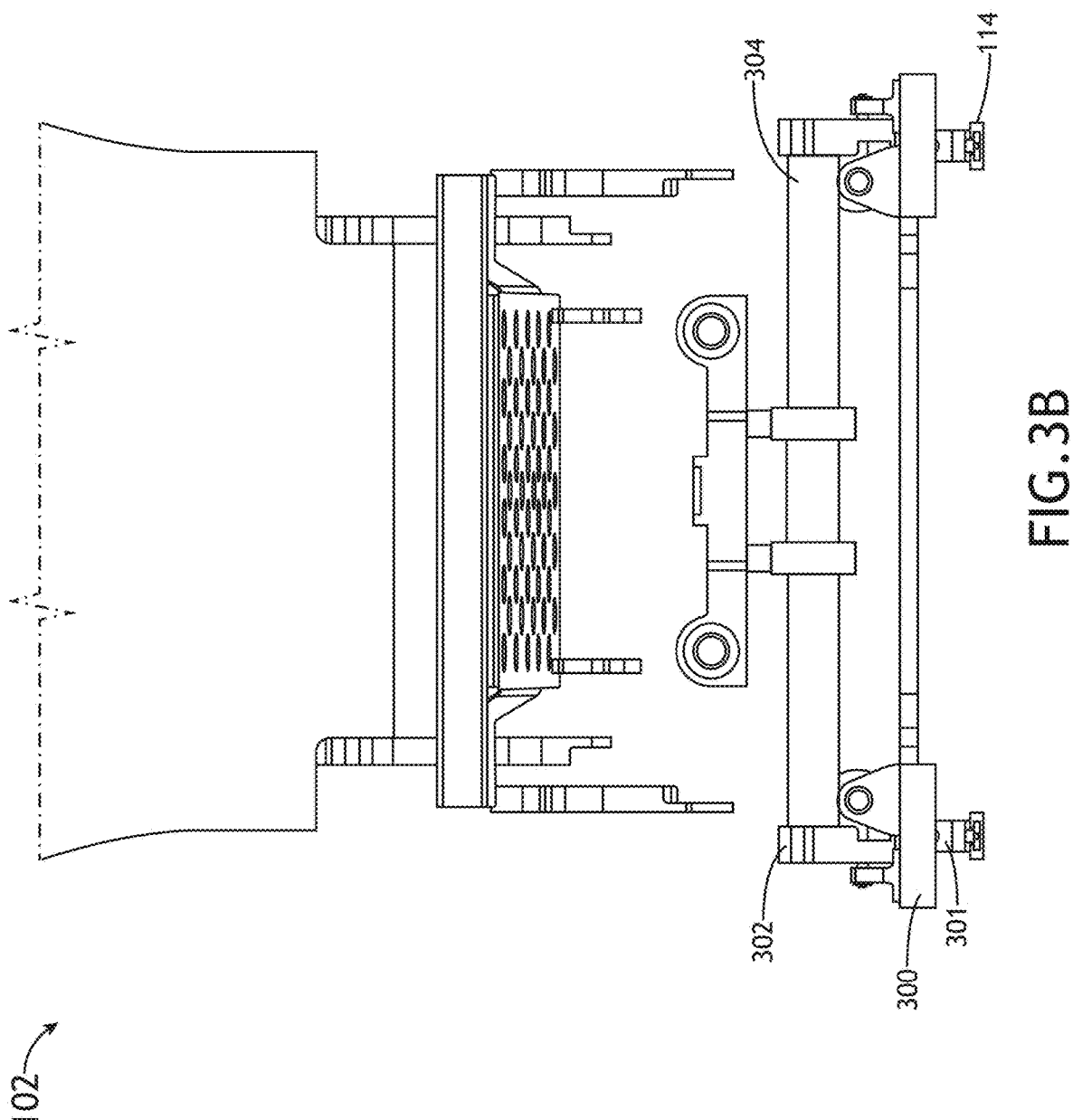
FIG. 3B illustrates a plinth seat base tracking system of the two-stage tracking system, in accordance with one or more embodiments of the disclosure.
Figure 3C:
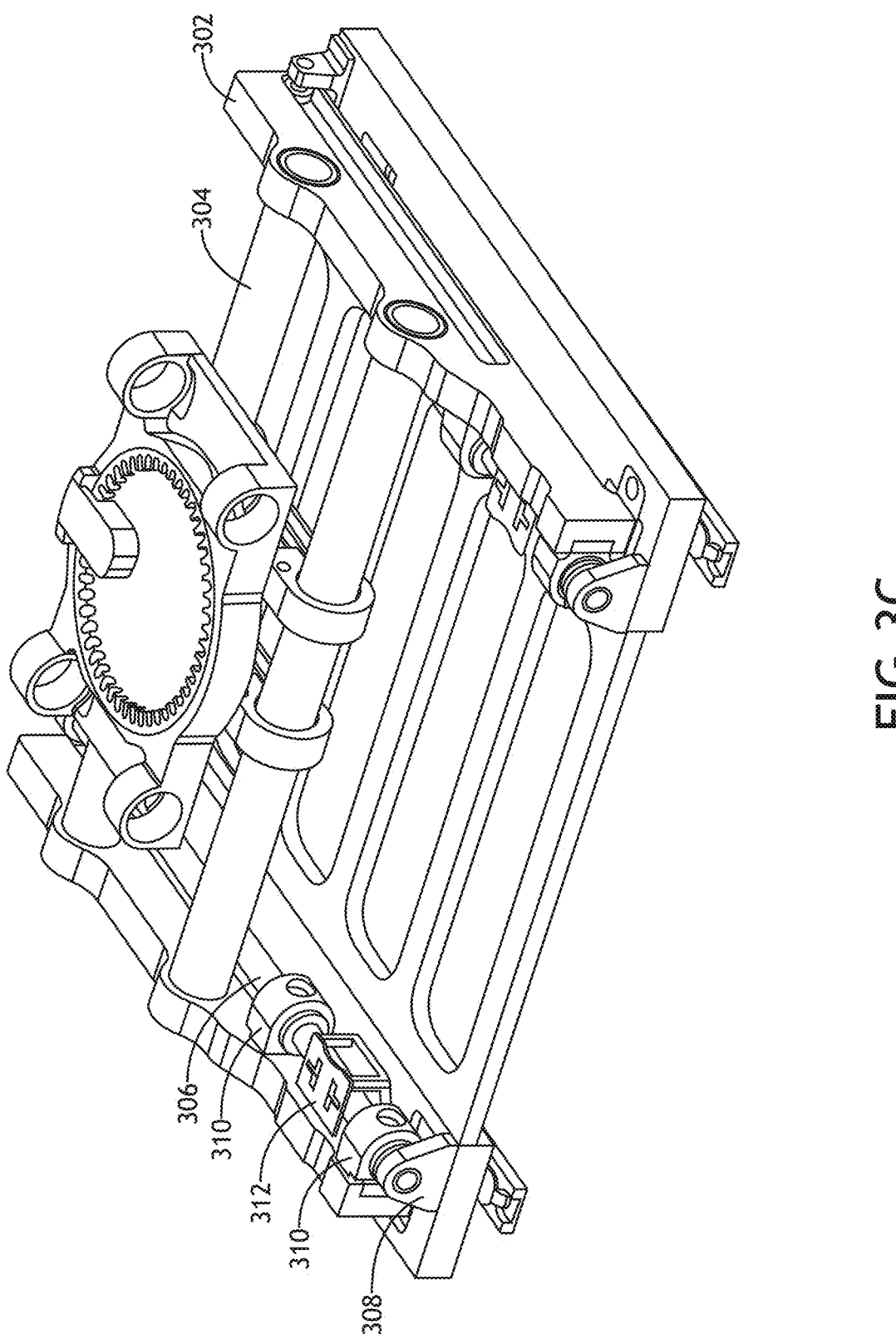
FIG. 3C illustrates a plinth seat base tracking system of the two-stage tracking system, in accordance with one or more embodiments of the disclosure.
Figure 3D:
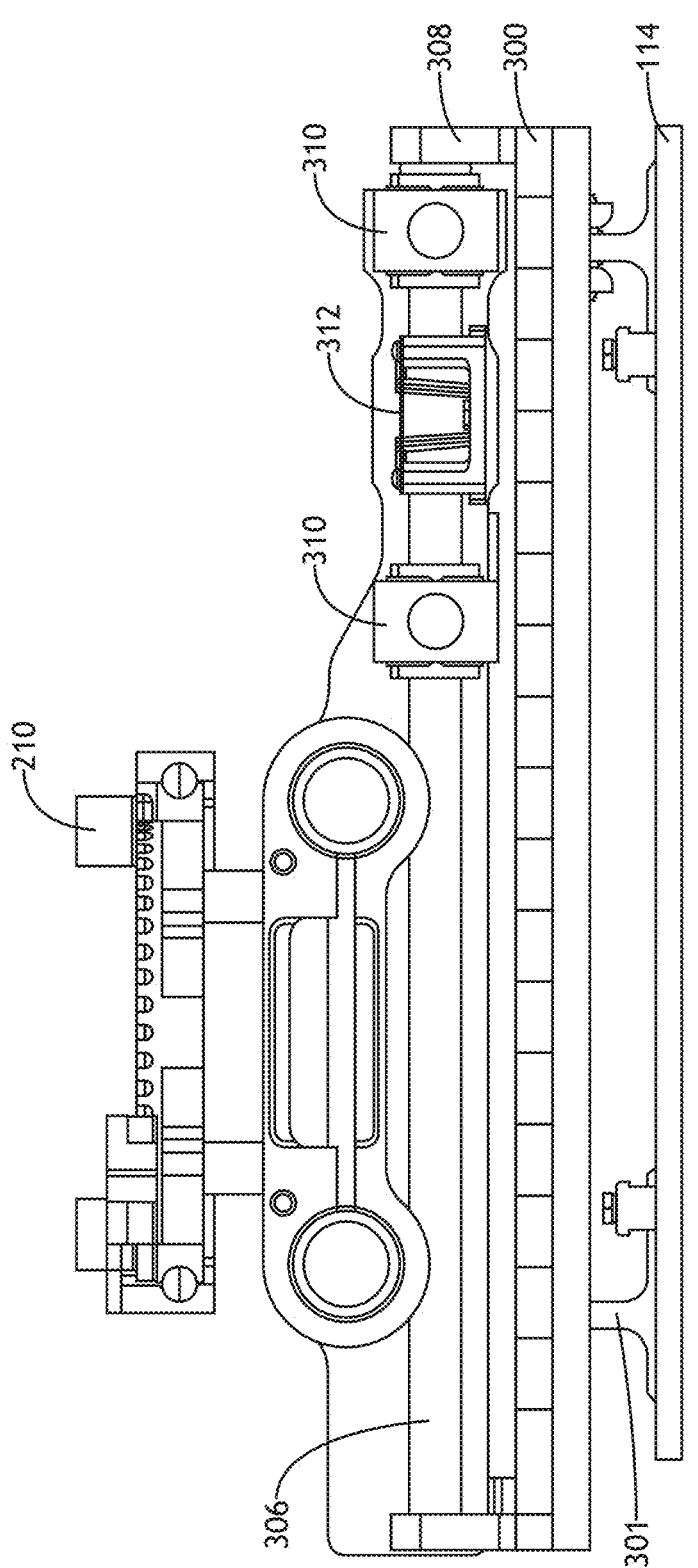
FIG. 3D illustrates a plinth seat base tracking system of the two-stage tracking system, in accordance with one or more embodiments of the disclosure.
Figure 3E:
FIG. 3E illustrates a plinth seat base tracking system of the two-stage tracking system in a deployed position, in accordance with one or more embodiments of the disclosure.
Figure 3F:
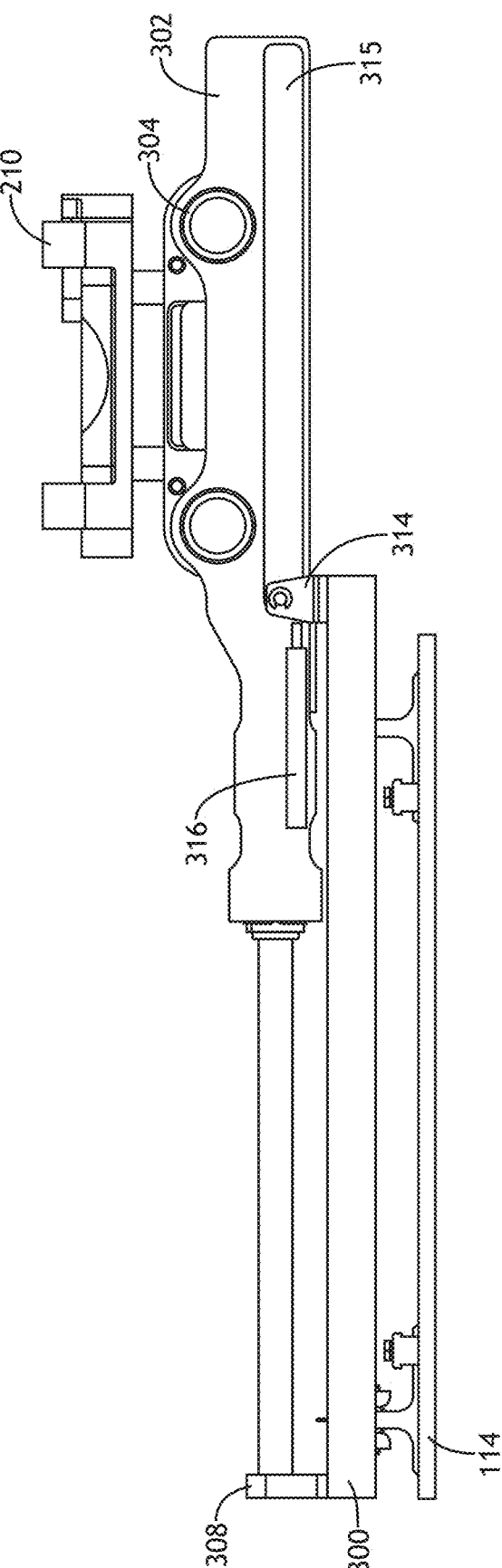
FIG. 3F illustrates a plinth seat base tracking system of the two-stage tracking system in a deployed position, in accordance with one or more embodiments of the disclosure.

The plinth seat base tracking system 212 may include one or more base tracking tubes 306. For example, the plinth seat base tracking system 212 may include a left base tracking tube 306 and a right base tracking tube 306. Referring to FIG. 3E, the one or more base tracking tubes 306 may be fixed to the fixed platform 300, such that translation of the plinth seat base tracking system 212 is achieved by translating the one or more frame members 302 along a shaft of the one or more base tracking tubes 306, as discussed further herein.

The one or more base tracking tubes 306 may be coupled to the one or more frame members 302 via one or more tube attachment members 308. For example, the one or more one or more base tracking tubes 306 may be coupled to the one or more frame members 302 at one or more rear positions via the one or more tube attachment members 308 and one or more front positions via the one or more tube attachment members 308.

The plinth seat base tracking system 212 may include one or more pillow blocks 310 and one or more brake assemblies 312. For example, the plinth seat base tracking system 212 may include a forward pillow block 310 and a rear pillow block 310. In this regard, the shaft of a respective base tracking tube 306 may translate (or rotate) through the respective pillow blocks 310 to translate the plinth seat base tracking system 212.

It is contemplated herein that the brake assembly 312 may arranged in any position relative to a respective pillow block 310 (e.g., in between pillow blocks, in front of the forward pillow block, aft of the aft pillow block, or the like) to facilitate stopping at any desired position. Further, as shown in FIG. 4B, the brake assembly 312 may be located on a separate tube.

The brake assembly 312 may be controlled by a user (e.g., passenger, crew member, or the like) via one or more cables/wires. For example, the cables/wires may be routed to the armrest 108 or any easily accessible area to the user.

Upon disengaging the brake assembly 312 via the cables/wires, the one or more frame members 302 may translate along the shaft of the respective pillow blocks 310 until in the desired position. As such, the plinth seat base tracking system 212 may achieve infinite adjustment positioning along the shaft of the respective base tracking tube 306 via the respective pillow blocks 310 and the brake assembly 312.

The plinth seat base tracking system 212 may include one or more rollers 314. For example, the one or more rollers 314 may be coupled to the platform 300 and rotate about a cavity 315 defined by one or more surfaces of the one or more frame members 302. In this regard, the one or more rollers 314 may provide vertical support and further act as a load-reacting member.

Figure 4A:
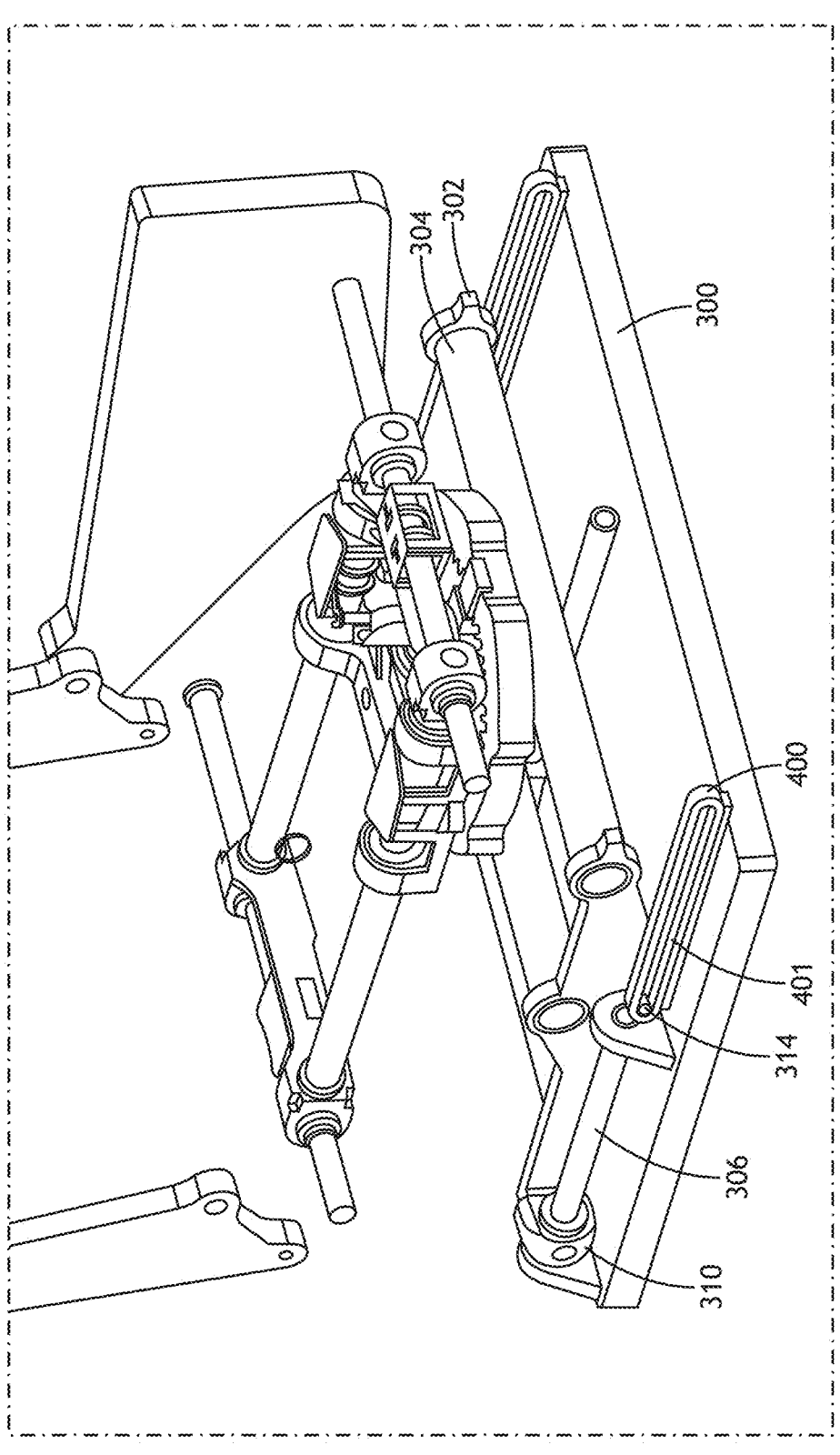
FIG. 4A illustrates a plinth seat base tracking system of the two-stage tracking system, in accordance with one or more embodiments of the disclosure.
Figure 4B:
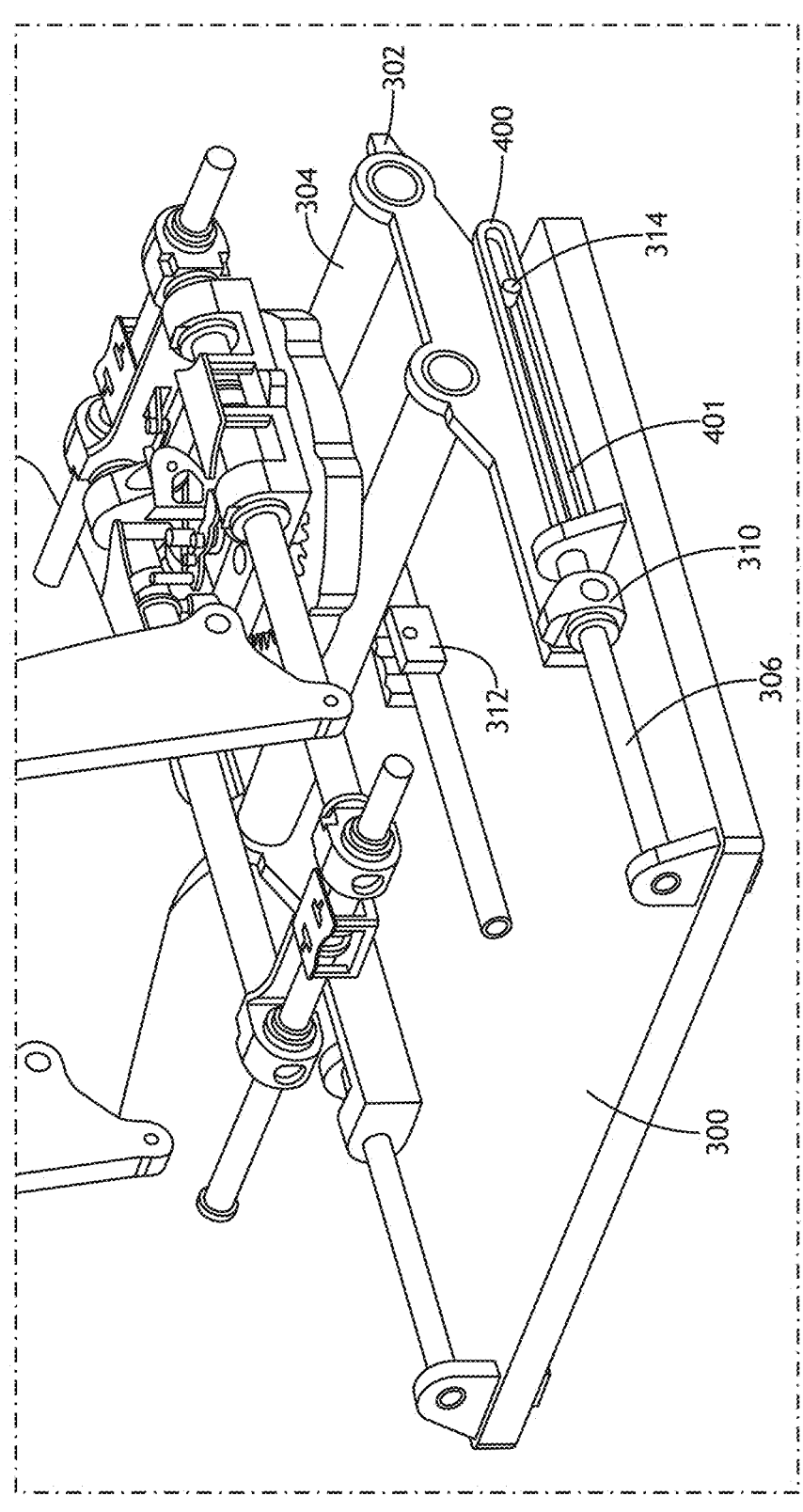
FIG. 4B illustrates a plinth seat base tracking system of the two-stage tracking system in a deployed position, in accordance with one or more embodiments of the disclosure.

In some embodiments, as shown in FIGS. 4A-4B, the one or more rollers 314 are coupled to the platform 300 and rotate about a cavity 401 defined by one or more surface of one or more roller members 400. The one or more roller members 400 may be coupled to a surface of the platform 300, such that as the shaft of the one or more base tracking tubes 306 translate through an opening in the respective pillow blocks 310, the one or more rollers 314 rotate about the cavity 401 of the one or more roller members 400, as shown in FIG. 4B.

In some embodiments, although not shown, the plinth seat base tracking system 212 may further include one or more horse-shoes. For example, the one or more horse-shoes may be configured to contain the one or more rollers 314 to limit lateral deformations.

The plinth seat base tracking system 212 may include one or more dampers 316 positioned proximate to the one or more rollers 314. For example, the one or more dampers 316 may be positioned proximate to the one or more rollers 314 to prevent an abrupt stop when reaching a predetermined end position.

Figure 5A:
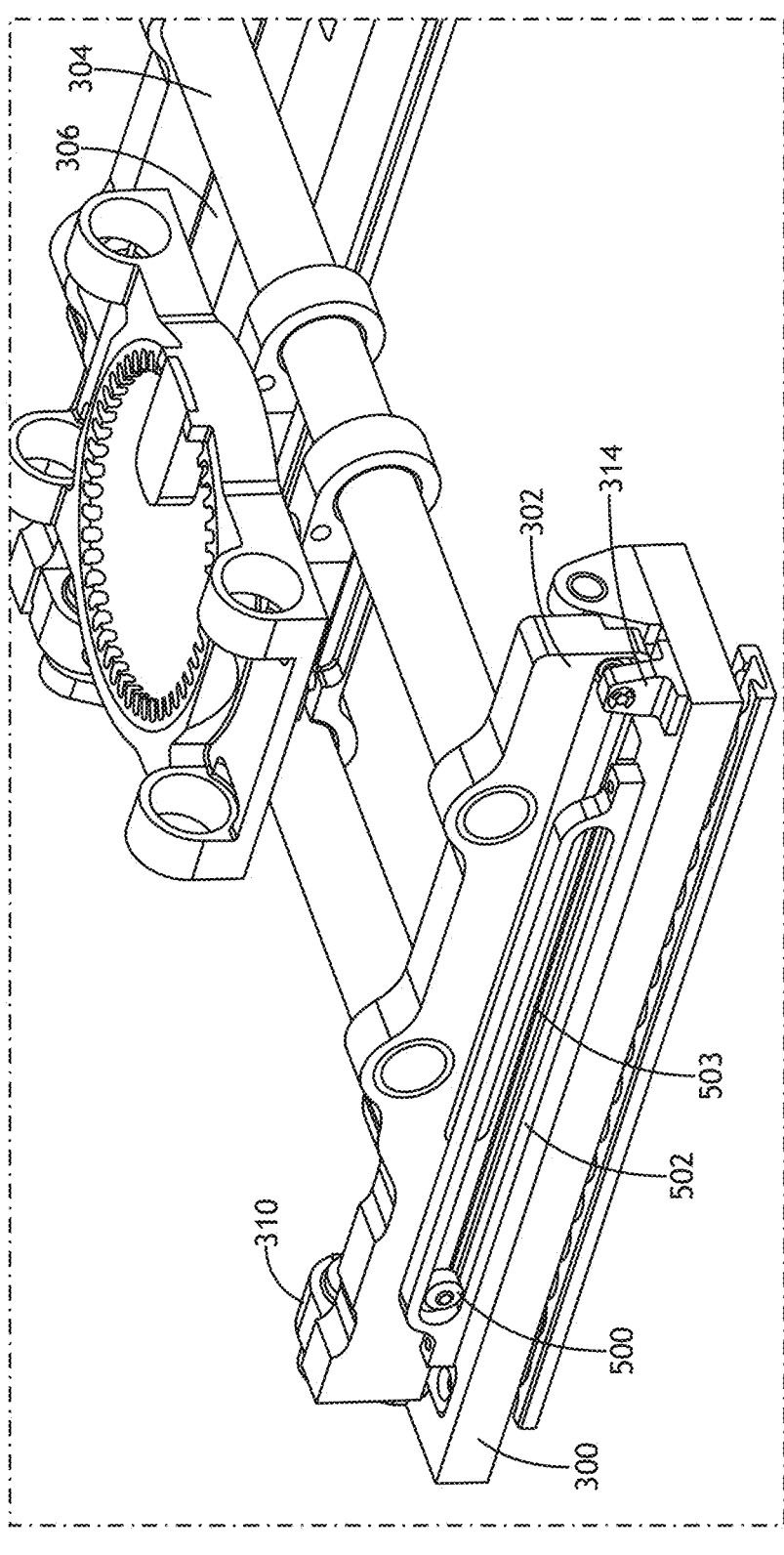
FIG. 5A illustrates a plinth seat base tracking system of the two-stage tracking system, in accordance with one or more embodiments of the disclosure.
Figure 5B:
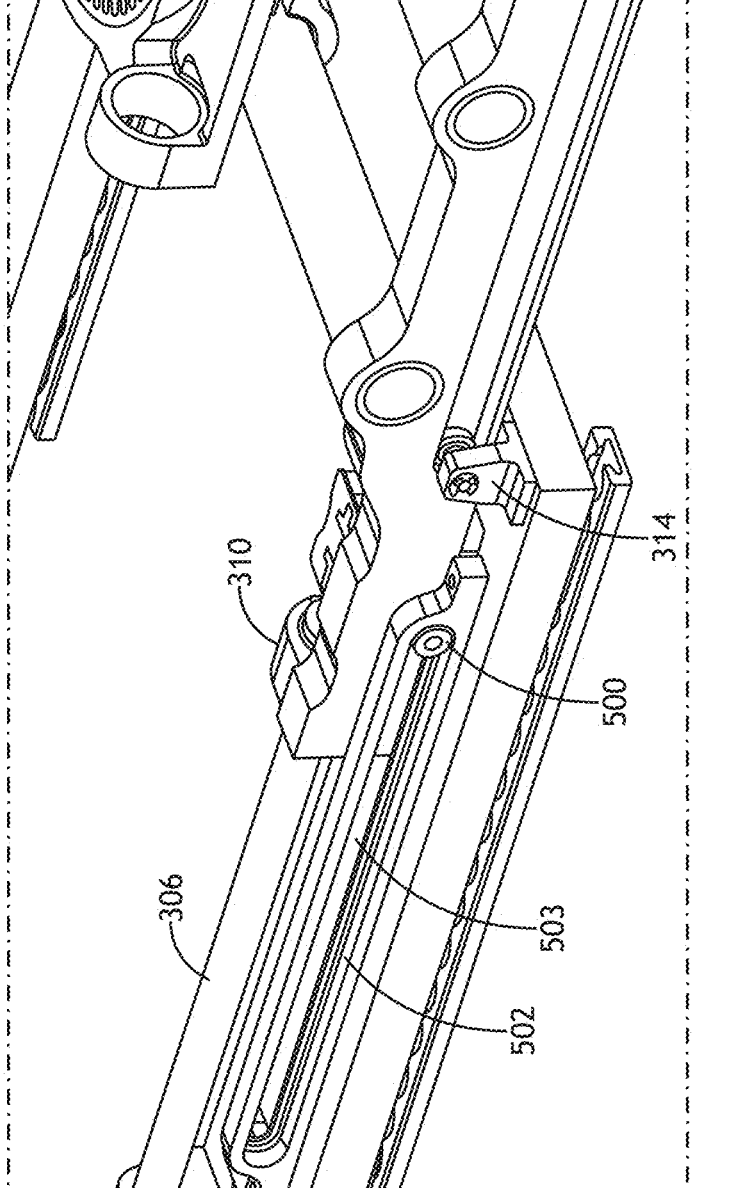
FIG. 5B illustrates a plinth seat base tracking system of the two-stage tracking system in a deployed position, in accordance with one or more embodiments of the disclosure.

Referring to FIGS. 5A-5B, the plinth seat base tracking system 212 may further include one or more additional rollers 500 and one or more containment members 502. For example, the one or more containment members 502 may be coupled to the platform 300, where a cavity 503 defined by one or more surfaces of the one or more containment members 502 receives the one or more additional rollers 500. In this regard, the one or more additional rollers 500 are configured to rotate about the cavity 503 of the one or more containment members 502 and provide additional containment measures when the plinth seat base tracking system 212 is translating along the shaft of the one or more base tracking tubes 306, as discussed previously herein.

The aircraft seat 102 may be adjusted electrically. For example, the aircraft seat 102 may include a control panel for adjusting the aircraft seat 102. The control panel may be coupled to an aircraft controller. For example, the conduit may directly run into a control panel coupled to the arms 108 of the aircraft seat 102. In this regard, a passenger may electrically adjust one of swivel, tracking, or vertical height via the control panel.

It is noted herein "vertical" may be understood as being defined with respect to a z-axis as illustrated in the Figures. In addition, it is noted herein "horizontal" may be understood as being defined with respect to an x-axis or a y-axis as illustrated in the Figures.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A seat base tracking system for an aircraft seat comprising:

a platform couplable to a floor of an aircraft via a set of seat tracks, the platform being fixed to one or more floor fittings coupled to the set of seat tracks when coupled to the floor of the aircraft;

one or more frame members arranged proximate to the platform;

one or more base tracking tubes coupled to the platform via one or more tube attachment members, wherein the one or more base tracking tubes are fixed to the platform; and a translation assembly configured to translate the one or more frame members along a shaft of the one or more base tracking tubes to provide seat base tracking with infinite adjustment positions, wherein the seat base tracking is independent from the set of seat tracks, wherein the translation assembly comprises:

one or more pillow blocks, wherein the one or more pillow blocks are coupled to the one or more frame members, wherein the shaft of the one or more base tracking tubes is configured to translate through an opening in the one or more pillow blocks when translating along the one or more base tracking tubes; and one or more brake assemblies, wherein disengagement of the one or more brake assemblies translates the one or more frame members along the shaft of the one or more base tracking tubes.

2. The seat base tracking system of claim 1, further comprising:

one or more rollers, wherein the one or more rollers are coupled to the platform, wherein the one or more rollers are configured to rotate about a cavity defined within the one or more frame members when the translation assembly translates the one or more frame members.

3. The seat base tracking system of claim 2, further comprising:

one or more dampers positioned proximate to the one or more rollers.

4. The seat base tracking system of claim 1, wherein the platform is a one-piece plinth.

5. The seat base tracking system of claim 1, further comprising:

one or more cross-tubes coupled to the one or more frame members.

6. The seat base tracking system of claim 1, further comprising:

a telescoping shroud assembly, wherein the telescoping shroud assembly comprises:

a fixed shroud coupled to a fixed portion of the seat base tracking system; and a translating shroud coupled to the fixed shroud, wherein the translating shroud is configured to translate via a shroud translation sub-assembly when the one or more frame members translate.

7. The seat base tracking system of claim 6, wherein the shroud translation sub-assembly comprises a slide and carriage system.

8. An aircraft seat comprising:

a seat frame; and a two-stage tracking system including a first stage tracking system and a second stage tracking system, the first stage tracking system couplable to the seat frame, the second stage tracking system couplable to a floor of an aircraft, the second stage tracking system comprising:

a platform couplable to the floor of the aircraft via a set of seat tracks, the platform being fixed to one or more floor fittings coupled to the set of seat tracks when coupled to the floor of the aircraft;

one or more frame members arranged proximate to the platform;

one or more base tracking tubes coupled to the platform via one or more tube attachment members, wherein the one or more base tracking tubes are fixed to the platform; and a translation assembly configured to translate the one or more frame members along a shaft of the one or more base tracking tubes to provide seat base tracking with infinite adjustment positions, wherein the seat base tracking is independent from the set of seat tracks; and a telescoping shroud assembly, the telescoping shroud assembly comprising:

a fixed shroud coupled to a fixed portion of the two-stage tracking system; and a translating shroud coupled to the fixed shroud, wherein the translating shroud is configured to translate via a shroud translation sub-assembly when the one or more frame members of the second stage tracking system translate.

9. The aircraft seat of claim 8, wherein the translation assembly further comprises:

one or more pillow blocks, wherein the one or more pillow blocks are coupled to the one or more frame members, wherein the shaft of the one or more base tracking tubes is configured to translate though an opening in the one or more pillow blocks when translating along the one or more base tracking tubes.

10. The aircraft seat of claim 9, wherein the translation assembly further comprises:

one or more brake assemblies, wherein disengagement of the one or more brake assemblies translates the one or more frame members along the shaft of the one or more base tracking tubes.

11. The aircraft seat of claim 8, wherein the second stage tracking system further comprises:

one or more rollers, wherein the one or more rollers are coupled to the platform, wherein the one or more rollers are configured to rotate about a cavity defined within the one or more frame members when the translation assembly translates the one or more frame members.

12. The aircraft seat of claim 11, further comprising:

one or more dampers positioned proximate to the one or more rollers.

13. The aircraft seat of claim 8, wherein the platform is a one-piece plinth.

14. The aircraft seat of claim 8, further comprising:

one or more cross-tubes coupled to the one or more frame members and the first stage tracking system.

15. The aircraft seat of claim 14, wherein the first stage tracking system is configured to translate along a shaft of the one or more cross-tubes during installation to a position, wherein the first stage tracking system is fixed in the position during operation.

16. The aircraft seat of claim 8, wherein the shroud translation sub-assembly comprises a slide and carriage system.

* * * * *